Dec. 10, 1935.     B. F. MONEY     2,024,054
NUT LOCK
Filed Nov. 30, 1934
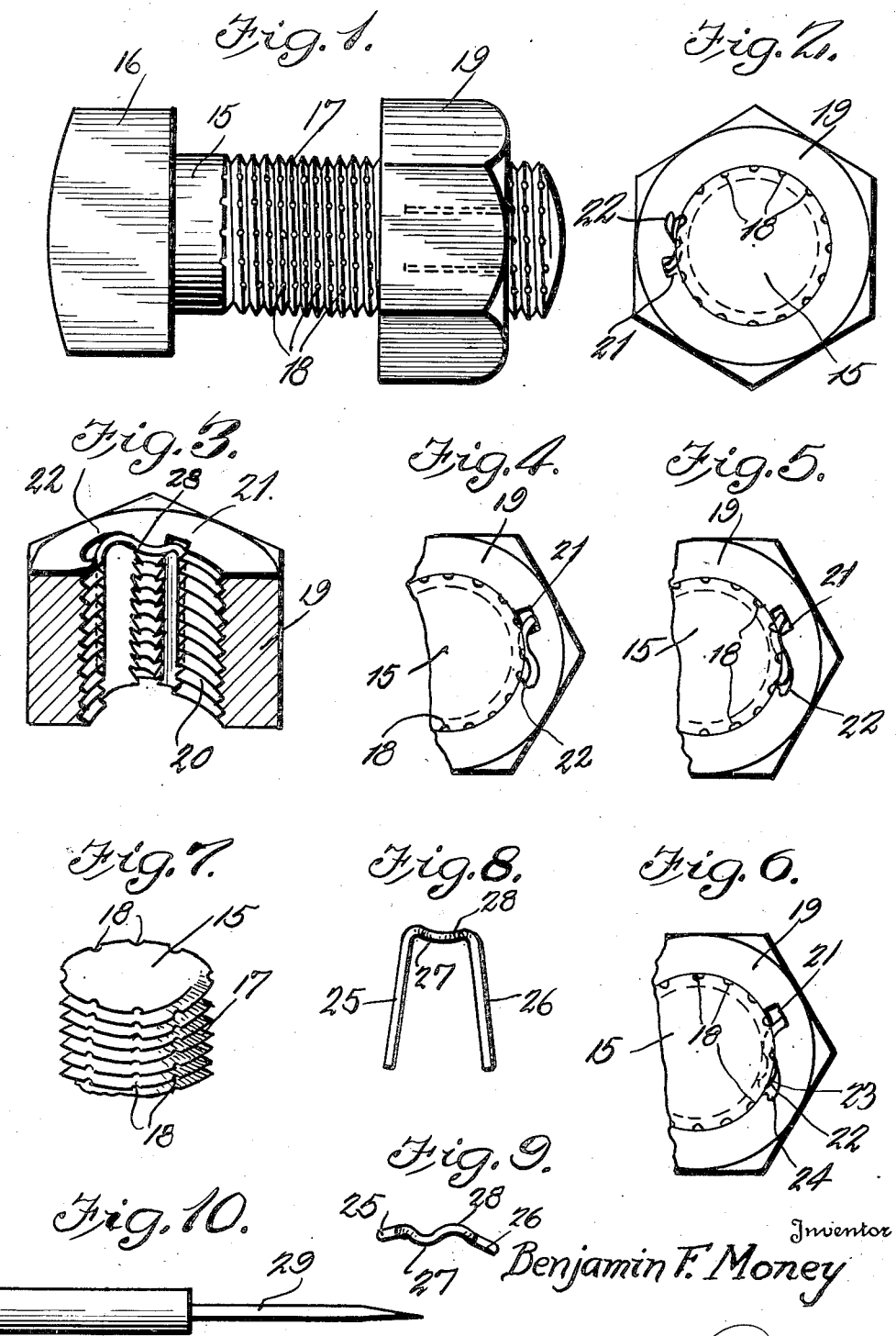
Inventor
Benjamin F. Money Patented Dec. 10, 1935

2,024,054

UNITED STATES PATENT OFFICE 2,024,054

NUT LOCK

Benjamin F. Money, Tulsa, Okla.

Application November 30, 1934, Serial No. 755,490

2 Claims. (Cl. 151—11)

This invention relates to certain new and useful improvements in nut locks.

The primary object of the invention is to provide a nut lock wherein the nut and threaded bolt with which the nut is associated have registering longitudinal grooves formed therein with a lock device in the form of a spring clip having side legs respectively positionable in a groove in the nut and a groove in the bolt and operable to permit progressive movement of the nut on the bolt and to prevent retrograde movement thereof.

A further object of the invention is to provide a nut lock of the foregoing character wherein the nut is provided with a pair of grooves to receive the legs of the locking spring clip that is adapted to be manually shifted to position both legs within the grooves in the nut and spaced from the grooves of the bolt whereby the nut may be freely reversely rotated for disengagement from the bolt.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a side elevational view of the assembled nut and screw bolt embodying the nut lock of the present invention;

Figure 2 is an end elevational view of the device with the locking device interposed between the nut and bolt;

Figure 3 is a sectional perspective view of a part of the nut showing the two longitudinal grooves therein and a resilient locking clip having the legs thereof seated in the groove with the head of the clip disposed at the outer end of the nut;

Figure 4 is a fragmentary end elevational view of the nut and bolt with the resilient locking clip in its released position to permit removal of the nut from the bolt;

Figure 5 is a fragmentary end elevational view, similar to Figure 4, showing the resilient locking clip illustrated in a position intermediate operative and inoperative positions;

Figure 6 is a fragmentary sectional view, similar to Figures 4 and 5 showing the resilient locking clip in its operative position having one leg positioned in a groove in the nut and the other leg positioned in a groove in the bolt;

Figure 7 is a fragmentary schematic perspective view of the threaded portion of the bolt showing a plurality of spaced longitudinally extending grooves or thread notches for ratcheting engagement with the legs of the locking clip;

Figure 8 is an elevational view of the resilient locking clip;

Figure 9 is an end elevational view of the clip; and

Figure 10 is a side elevational view of an awl or other pointed implement for manually shifting the resilient locking clip from one position to another.

Referring more in detail to the accompanying drawing, the reference character 15 designates the shank of a bolt provided with a polygonal head 16 and a threaded portion 17. As clearly shown in Figures 1 and 7, the threads 17 of the bolt shank are provided with spaced rows, grooves or notches 18 extending longitudinally of the bolt for ratcheting engagement with a resilient locking clip carried by the nut associated with the bolt.

The nut 19 that is preferably of polygonal formation is internally threaded as at 20 for threaded engagement with the threads 17 of the bolt shank 15 and the inner threaded wall of the nut 19 is provided with a pair of spaced longitudinally extending grooves 21 and 22. The groove 21 is of substantially rectangular formation in end elevation while the groove 22 is of greater width than the groove 21 and has a curved bottom wall 23 with an abutment shoulder 24 at one side thereof.

A resilient locking clip is associated with the bolt 15 and nut 19, being carried by the nut and as shown in Figures 8 and 9 is of U-shape and in the form of a spring clip embodying side legs 25 and 26 connected by a head of reverse curved formation embodying oppositely bent portions 27 and 28. The head 27—28 is the bridge of the spring clip and runs in the helical grooves 17 of the bolt 15 during relative rotation of the nut on the bolt. The normally spread apart legs 25 and 26 of the resilient locking clip are moved toward each other against the resiliency of the device for reception in the parallel grooves 21 and 22 in the inner threaded face of the nut 19 with the head of the spring clip embodying the bent portions 27 and 28 disposed at the outer end of the nut 19.

The resilient locking clip is engaged with the nut and assumes the position shown in Figure 4 and when so disposed, the nut 19 is threaded onto the threaded portion 17 of the bolt shank 15. At any time before the nut is fully screwed home, a pointed implement such as an awl 29 as shown in Figure 10, or an ordinary pocket knife or any other pointed implement is engaged at the head of the spring clip to move the side legs 25 and 26 thereof relative to the grooves 21 and 22, the initial movement of the spring clip being illustrated in Figure 5. Continued manipulation of the resilient locking clip removes the side leg 26 of the groove 22 in the nut and positions the same in engagement with the threads 17 of the bolt for ratcheting engagement with the notches 18 of the bolt threads. Clockwise rotation of the nut 19 on the bolt causes a petering action of the spring clip head at the outer end of the bolt, the leg 25 in the groove 21 moving toward the bolt shank while the leg 26 moves in a direction away from the bolt shank and toward the groove 22 in the nut. When the nut 19 is reversely rotated on the bolt shank, the abutment shoulder 24 at one end of the nut groove 22 moves into engagement with the leg 26 of the spring clip for forcing the same into the aligned notches 18 of a row in the threaded portion 17 of the bolt shank thereby locking the nut from retrograde movement on the bolt. When it is desired to remove the nut from the bolt, the awl 29 is engaged with the belt portion 27 of the spring clip head for disengaging the leg 26 of the spring clip from the bolt shank and positioning the same entirely within the nut groove 22 and with both legs 25 and 26 of the spring clip positioned in the nut grooves 21 and 22, as shown in Figure 2, and the nut is easily unthreaded from the screw bolt. To facilitate positioning of the leg 26 of the spring clip in the groove 22, the nut should be rotated on the bolt for positioning the leg 26 out of registry with a row of thread notches 18.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. In a nut lock of the character described, a threaded bolt having longitudinal rows of ratcheting notches in the threads thereof, a nut threaded on the bolt and having a pair of parallel grooves in its threaded bore, and a spring clip having a pair of legs and a connecting head at one end with the legs respectively received in the grooves in the nut for normal position therein and adapted to be manually shifted for placing one of the legs outwardly of its groove for ratcheting engagement with the ratcheting grooves of the bolt threads, the resiliency of the legs and formation of the grooves being operative for retaining the legs in shifted positions.

2. In a nut lock of the character described, a threaded bolt having longitudinal rows of ratcheting grooves in the threaded portion thereof, a nut threaded on the bolt and having a pair of parallel grooves in the threaded bore thereof, a U-shaped spring clip having the legs thereof respectively received in the grooves in the nut with the head of the legs positioned outwardly of the end of the nut and said head adapted to be manually rotated for displacing one of the legs from its nut groove for ratcheting engagement with the grooves in the bolt threads, the legs of the clip and the walls of the grooves being cooperatively formed whereby the legs remain in their shifted positions.

BENJAMIN F. MONEY.